United States Patent [19]

Kaneda et al.

[11] Patent Number: 5,066,075
[45] Date of Patent: Nov. 19, 1991

[54] INTEGRATED ACTUATOR UNIT FOR ANTI-SKID BRAKE CONTROL SYSTEM FOR AUTOMOTIVE VEHICLE

[75] Inventors: Ichiro Kaneda; Seiji Yamamoto; Natsuji Fujii, all of Kanagawa, Japan

[73] Assignee: Atsugi Unisia Corporation, Kanagawa, Japan

[21] Appl. No.: 456,367

[22] Filed: Dec. 26, 1989

[30] Foreign Application Priority Data

Dec. 26, 1988 [JP] Japan .................. 63-168902[U]
Dec. 28, 1988 [JP] Japan .................. 63-170190[U]

[51] Int. Cl.⁵ .................................. B60T 8/32
[52] U.S. Cl. ..................... 303/113 R; 303/119 R; 303/115 PP
[58] Field of Search ............... 303/113, 114, 115, 116, 303/119

[56] References Cited

U.S. PATENT DOCUMENTS

| | | | |
|---|---|---|---|
| 3,934,941 | 1/1976 | Holmes | 303/113 |
| 3,989,313 | 11/1976 | Toms | 303/113 |
| 4,796,958 | 1/1989 | Brown | 303/113 |
| 4,813,448 | 3/1989 | Leiber | 303/113 X |

*Primary Examiner*—Douglas C. Butler
*Attorney, Agent, or Firm*—Ronald P. Kananen

[57] ABSTRACT

An actuator unit for an anti-skid brake system for an automotive vehicle, employs a built-in structure, in which all components, such as an EV valve, an AV valve, a pressure accumulator, an one-way check valve and so forth, are built-in a single cast block casing. Especially, fluid flow paths are formed integrally with the casing for enabling the overall unit compact enough for facilitating in the limited space in a vehicular body.

18 Claims, 4 Drawing Sheets

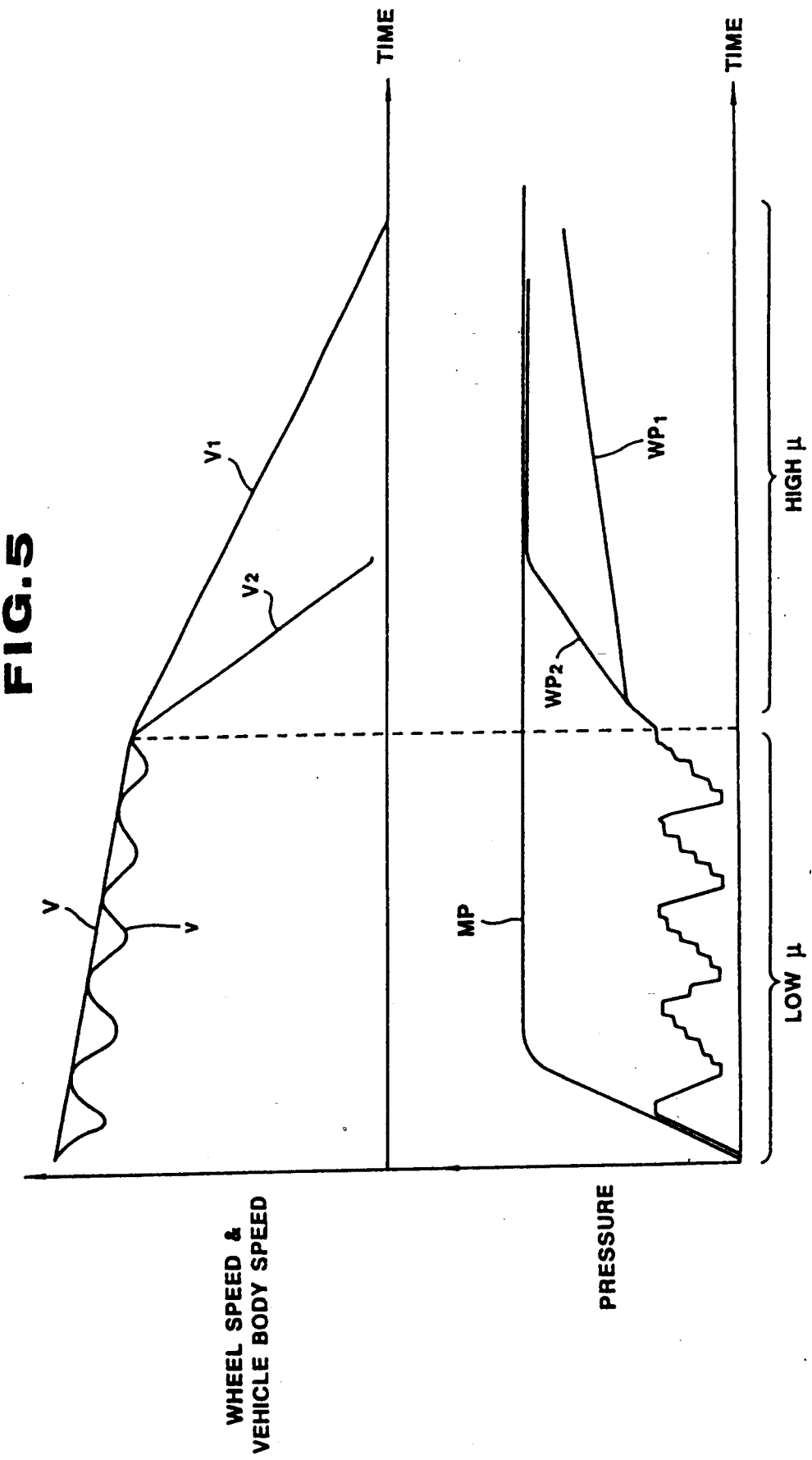

INTEGRATED ACTUATOR UNIT FOR ANTI-SKID BRAKE CONTROL SYSTEM FOR AUTOMOTIVE VEHICLE

BACKGROUND OF THE INVENTION

1. Field of the Invention

The present invention relates generally to an anti-skid brake control system for an automotive vehicle for controlling braking pressure to be built-up in a wheel cylinder of an automotive brake unit. More specifically, the invention relates to an actuator unit for delivering controlled pressure to an associated wheel cylinder in order to provide optimal braking performance of the vehicle.

2. Description of the Background Art

In the typical construction of an actuator unit employed in a circuit of an automotive anti-skid brake system, an inlet valve (EV valve) and an outlet valve (AV valve), a pressure accumulator, a fluid pump, a fluid reservoir, one-way check valves and so forth are provided for adjusting fluid pressure to be delivered to the wheel cylinder according to wheel slippage in order to maintain wheel slippage in an optimal range, i.e. 10% to 20%.

As will be appreciated, a substantially high pressure, e.g. 300 atm is active in the hydraulic brake circuit during application of a brake. For substantially high pressure, the components forming the actuator unit for the anti-skid brake control system are required to have a satisfactorily high leak-proof construction. For this reason, respective components, such as an EV valve, AV valve and so forth as well as fluid path piping are formed independently of each other. Such independently formed components are assembled into one unit by means of a connecting or housing block. In such prior proposed actuator units, since each of the independently formed components has to be provided with sufficient strength under high fluid pressure and to have sufficient leak-tight construction, each of the components is necessarily bulky. Therefore, the assembled unit is substantially bulky to cause inconvenience in mounting in a substantially limited space on the vehicle. Furthermore, such bulky unit is necessarily heavy in weight for causing weight problem.

SUMMARY OF THE INVENTION

Therefore, it is an object of the present invention to provide an integrated actuator unit which can solve the drawbacks in the prior art set forth above.

Another object of the invention is to provide an integrated actuator unit which is light in weight and compact for conveniently facilitating installation in the vehicle body.

In order to accomplish this, an actuator unit, according to the present invention, employs a built-in structure, in which all components are built-in a single cast block casing. Especially, fluid flow paths are formed integrally with the casing for enabling the overall unit to be compact enough for facilitating installation in the limited space in a vehicular body.

According to one aspect of the invention, an integrated actuator unit for an anti-skid automotive brake system comprises:

a cast casing defining a first space for receiving an inlet valve assembly for introducing a braking pressure built in a master cylinder of a hydraulic brake circuit to a wheel cylinder, and a second space for receiving an outlet valve assembly for draining braking pressure in the wheel cylinder, the inlet and outlet valves being selectively operated to open and closed positions for adjusting braking pressure in the wheel cylinder; and fluid flow path means integrally formed with the casing for communication with the hydraulic brake circuit and the first and second space.

The casing may comprise a main body defining at one end open bores in a parallel relationship to each other, which bores serve as the first and the second spaces for receiving the inlet and outlet valves, and a cover member for sealingly closing the open ends of the bores. The integrated actuator unit may further comprise a ventilation path means integrally provided with the casing for ventilating air introduced into working fluid therethrough. The ventilation path means may include a component communicating with the first and second space and also communicating with a discharge outlet of the ventilation path means. In this case, the communication component may be formed of a metallic pipe integrally cast with the casing by internal chill.

The metallic pipe may be formed of a metal having a higher melting point than that of a metallic material of the casing. Preferably, the casing is formed of an aluminum alloy and the metallic pipe is formed of a steel.

The casing may further define a third bore extending essentially perpendicular to the first and second bore and internally communicated at least with the first bore, the third bore serving for receiving a pressure accumulator connected to an integrally formed path which is connected to a drain line of the hydraulic circuit for receiving a pressurized fluid via a fluid pump, which accumulator is connected to the first space for supplying pressurized fluid via a path integrally formed with said casing. In such case, the pressure accumulator may further incorporate a pressure regulating means which is integrally formed with the actuator and supplies regulated pressure for the first space.

According to another aspect of the invention, an anti-skid brake system for an automotive vehicle, comprises:

a master cylinder for building up hydraulic braking pressure according to depression of a brake pedal;

a wheel cylinder associated with a vehicular wheel for applying a braking force for decelerating rotation of the vehicular wheel;

a first line for supplying a braking pressure generated in the master cylinder;

a second line connected to a fluid reservoir for draining fluid in the wheel cylinder to the fluid reservoir;

a third line connected to the wheel cylinder;

an anti-skid actuator unit including a cast casing defining a plurality of fluid paths including a first path, a second path, a third path, a first space receiving an inlet valve assembly for introducing a braking pressure built in a master cylinder of a hydraulic brake circuit to a wheel cylinder, and a second space for receiving an outlet valve assembly for draining braking pressure in the wheel cylinder, the inlet and outlet valves being selectively operated to open and closed positions for adjusting braking pressure in the wheel cylinder, the first path communicating the first line to the first space, the second path communicating the second line with the second space and the third path for communicating the first and second space with the third line.

BRIEF DESCRIPTION OF THE DRAWINGS

The present invention will be understood more fully from the detailed description of the present invention given herebelow and from the accompanying drawings of the preferred embodiments, which, however, should not be taken to limit the invention to the specific embodiments but are for explanation and understanding only.

In the drawings:

FIG. 2 is a partial section of the preferred embodiment of an actuator unit according to the invention, showing a portion of the unit, in which an EV valve and an AV valve are built-in;

FIG. 5 is a chart showing anti-skid operation.

DESCRIPTION OF THE PREFERRED EMBODIMENT

Figure 1:
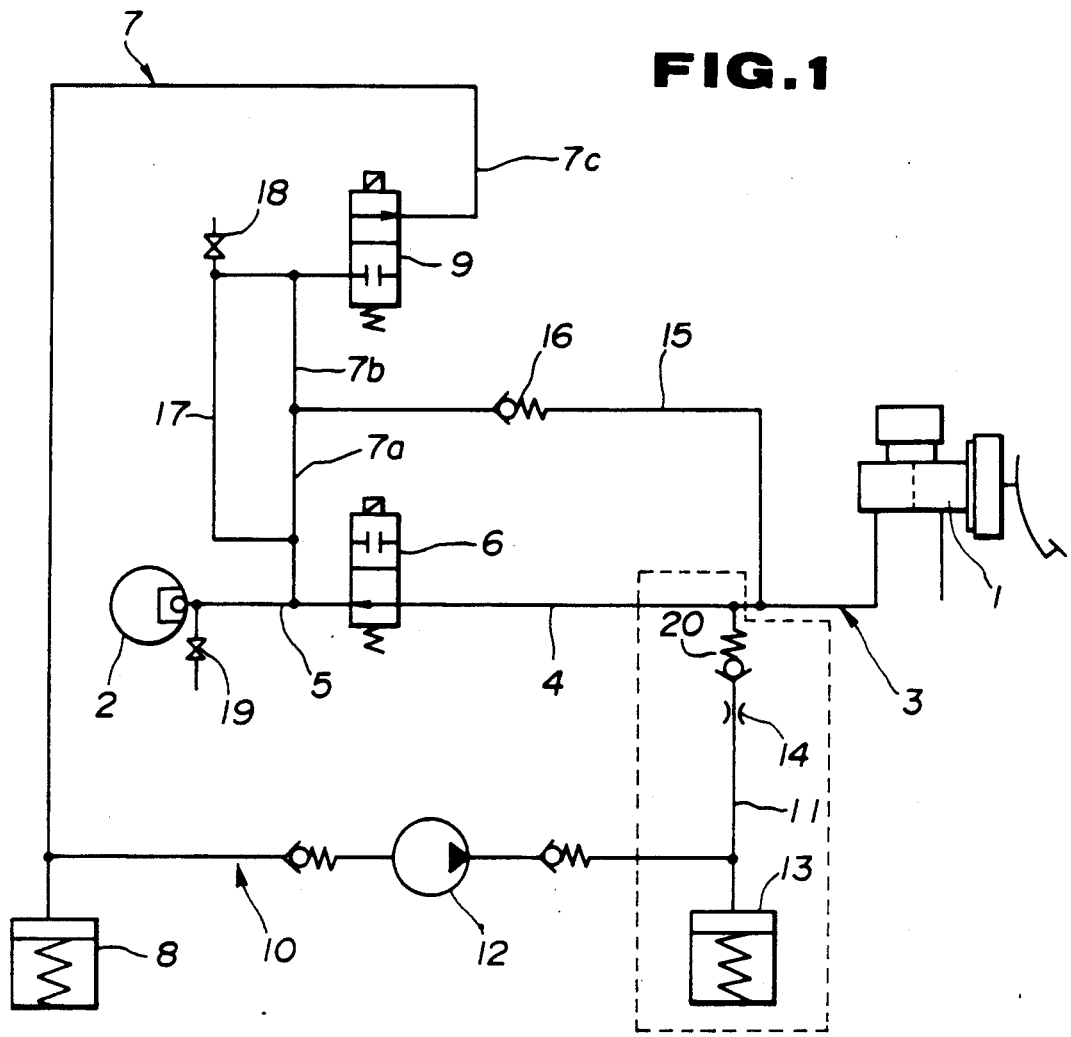
FIG. 1 is a hydraulic circuit diagram showing a typical construction of a hydraulic circuit in an anti-skid brake control system, in which the preferred embodiment of an actuator unit is applicable.

Referring now to the drawings, particularly to FIG. 1, the typical construction of a hydraulic circuit for each wheel cylinder in an anti-skid brake system includes a master cylinder 1 which is mechanically associated with a brake pedal and a wheel cylinder 2, in which braking pressure is built up for decelerating a vehicular wheel. The outlet port of the master cylinder 1 is connected to the wheel cylinder 2 via a hydraulic circuit which includes a primary line 3, a branch line 4 and a control line 5 for supplying braking pressure built up in the master cylinder to the wheel cylinder. An inlet valve (EV valve) 6 is disposed between the branch line 4 and the control line 5, which EV valve establishes and blocks fluid communication between the branch line 4 and the control line 5 in order to adjust the braking pressure to be supplied to the wheel cylinder 2. On the other hand, a drain line 7 connects the control line 5 to a reservoir 8. An outlet valve (AV valve) 9 is disposed within the drain line 7 for establishing and blocking fluid flow through the drain line for adjusting the fluid pressure in the wheel cylinder 2. The drain line 7 is constituted of a first section 7a and a second section 7b which are both oriented upstream of the AV valve 9, and a third section 7c oriented downstream of the AV valve.

A recirculation line 10 is connected to the third section 7c of the drain line 7 and to a re-application line 11 which connects the branch line 4 to a pressure accumulator 13 oriented downstream of the junction between the recirculation line 10 and the re-application line 11. A fluid pump 12 is disposed within the recirculation line 10 for feeding the fluid to the re-application line. On the other hand, a flow restriction orifice 14 and a one-way check valve 20 are disposed in the re-application line 11, which one-way check valve 20 permits fluid flow from the recirculation line 10 to the branch line 4 via the re-application line 11. The pressure accumulator 13 and the flow restriction orifice 14 cooperate with each other for regulating the fluid pressure to be supplied to the branch line 4.

A by-pass line 15 with a one-way check valve 16 connects the intersection between the first and second sections 7a and 7b of the drain line 7 and the branch line 4. The one-way check valve 16 provides flow restriction for the fluid flow from the branch line 4 to the drain line 7 and permits the fluid flow in the opposite direction. Furthermore, a ventilation line 17 with a ventilation valve 18 is also connected to the first section 7a.

As is well known, the EV valve 6 and the AV valve 9 comprise electromagnetic valve which are connected to an anti-skid control unit (not shown) which comprises a microprocessor. The control unit is connected to wheel speed sensors (not shown) for monitoring wheel slippage and derives an anti-skid brake control signal for controlling valve positions of the EV and AV valves in order to establish various mode positions, i.e. an APPLICATION mode for increasing fluid pressure in the wheel cylinder, in which the EV valve is open and the AV valve is closed, a RELEASE mode for decreasing fluid pressure in the wheel cylinder, in which the EV valve is closed and the AV valve is open, and a HOLD mode for maintaining the fluid pressure in the wheel cylinder constant, in which both of the EV and AV valves are closed.

Various logics may be introduced in derivation of the anti-skid brake control signal depending upon wheel slippage. For example, processes of anti-skid control which are applicable for controlling the EV valve 6, the AV valve 9 and the fluid pump 12, have been disclosed in the below-mentioned U.S. patents.

U.S. Pat. No. 4,674,049, issued in June 16, 1987
U.S. Pat. No. 4,704,684, issued on Nov. 3, 1987
U.S. Pat. No. 4,683,537, issued on July 28, 1987
U.S. Pat. No. 4,862,364, issued on Aug. 29, 1989

The disclosures of the above-identified U.S. Patents are herein incorporated by reference for the sake of disclosure.

The EV valve 6, the AV valve 9, the pressure accumulator 13 and associated circuit components are combined for forming an anti-skid actuator unit according to the present invention. The present invention is directed to an integrated actuator unit which is housed within a cast casing. The preferred embodiment of the actuator unit according to the present invention will be discussed hereinbelow.

Figure 2:
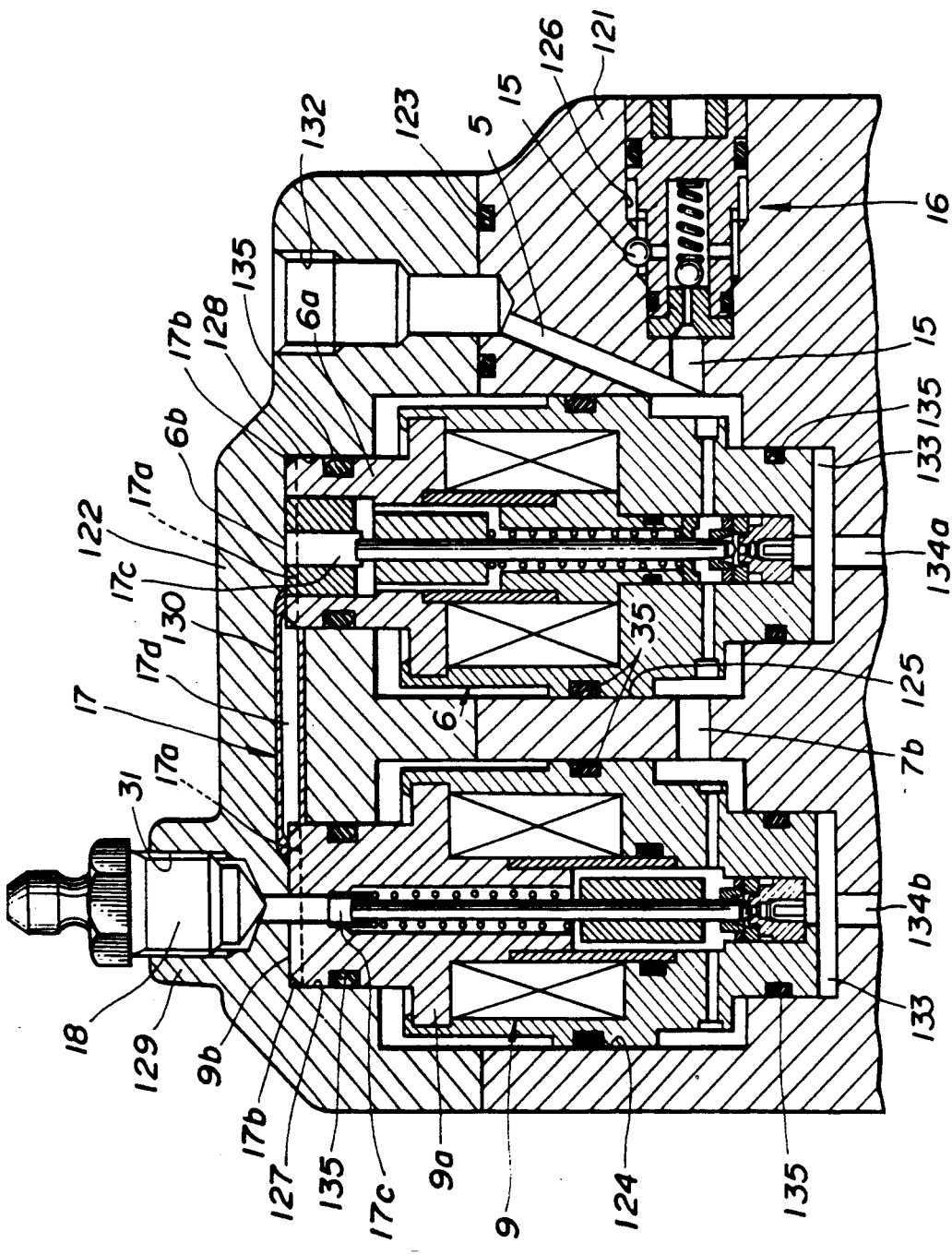

FIG. 2 shows a part of the preferred embodiment of the actuator unit, in which the EV valve 6 and the AV valve 9 are housed. In FIG. 2, the preferred embodiment of the actuator unit, according to the present invention, includes an actuator unit casing 121. The casing 121 is formed of an aluminum alloy die cast and has an open upper end which is closed by means of a cover member 122 which establishes a liquid tight seal by means of seal members 123. The casing 121 defines an AV valve receptacle bore 124 for receiving the AV valve 9, and an EV valve receptacle bore 125 for receiving the EV valve 6. These bores 124 and 125 are arranged in a parallel relationship to each other. In addition, a receptacle bore 126 is defined in the casing 121 for receiving the one-way check valve 16. The cover member 122 is also formed with bores 127 and 128 in alignment with the bores 124 and 125 in order to receive the upper sections of the AV and EV valves 6 and 9. Communicating with the bore 127, a threaded bore 131 is formed through a boss section 129 in axial alignment with the bore 127, to which threaded bore, the ventilation valve 18 in a form of a threaded plug is engaged in a liquid tight fashion. The threaded bore 131 is communicated with the ventilation line 17. As can be seen from FIG. 2, the ventilation line 17 is communicated with the bore 128. The ventilation line 17 is formed integrally with the cover member 122.

Figure 3:
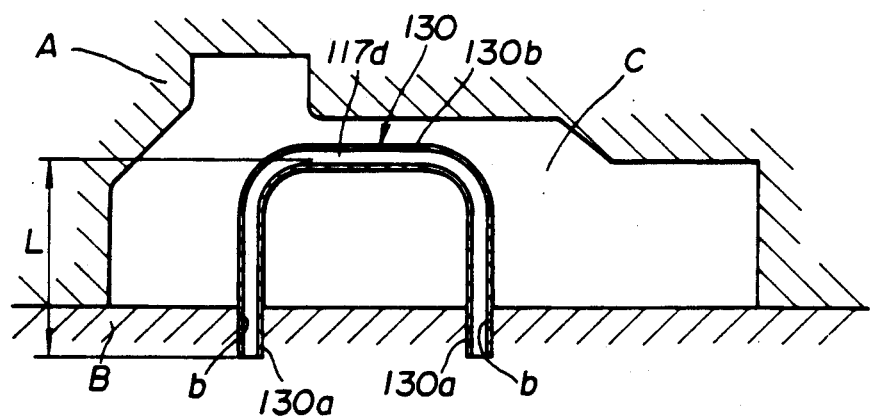
FIG. 3 is a section showing formation of a built-in fluid path for communication between the EV and AV valves.

The ventilation line 17 is formed by cut-out grooves 17a, outer circumferentially extending grooves 17b, a radially extending groove 17c formed on the upper end of the valve casings 6a and 9a and a communication path 17d which communicates the radially extending grooves 17c. As seen from FIG. 3, the communication path 17d is formed with a small diameter pipe 130 which is formed integrally with the cover member 122 by internal chill. In order to enable integral formation of the pipe 130, the pipe is formed of a material having a melting point higher than that of the aluminum alloy forming the cover member. The pipe 130 is formed into essentially an U-shaped configuration to have a horizontally-extending section 130b and axially extending sections 130a. During the casting process, the lower ends of the sections 130a are placed within bores b formed in a lower casting mold and thus positioned within a cavity C defined between the upper and lower casting molds A and B. In the position placed in the cavity C, the horizontal section 130b is placed at the equal elevation L to the cut-out grooves 17a. With the shown construction, the position of the lower end of the section 130a serves as reference position for providing accuracy in casting process.

In the shown process, since both ends of the pipe 130 are placed within the bores b, blocking of the pipe can be successfully prevented. Furthermore, in order to provide better adhering ability of the outer periphery of the pipe 130, it may be possible to form an aluminum layer on the outer periphery so as to establish a firm connection between the outer circumference of the pipe and the cast block.

The EV valve 6 and the AV valve 9 have valve bodies 6a and 9a with upper ends 6b and 9b. A plurality of seal members 135 are provided between the inner periphery of the bores 125 and 124 and the casings 6a and 9a of the EV and AV valves 6 and 9. The valve bodies 6a and 9a are normally biased upwardly by means of waving washers 133 provided in the bottoms of the bores 125 and 124. A fluid flow path opening 134a is formed in communication with the bore 125 for communication with the branch line 4. Similarly, a fluid flow path opening 134b is formed in communication with the bore 124 for establishing communication with the third section 7c of the drain line 7. These openings 134a and 134b are formed integrally with the casing 121. Also, the second section 7b of the drain line 7 is integrally and laterally formed in the casing 121 for establishing communication between the bores 125 and 124. The control line 5 is also defined through the casing 121, which control line extends in a direction oblique to the axis of the EV valve 6. The control line 5 is communicated with a control port 132 formed through the cover member 122.

Figure 4:
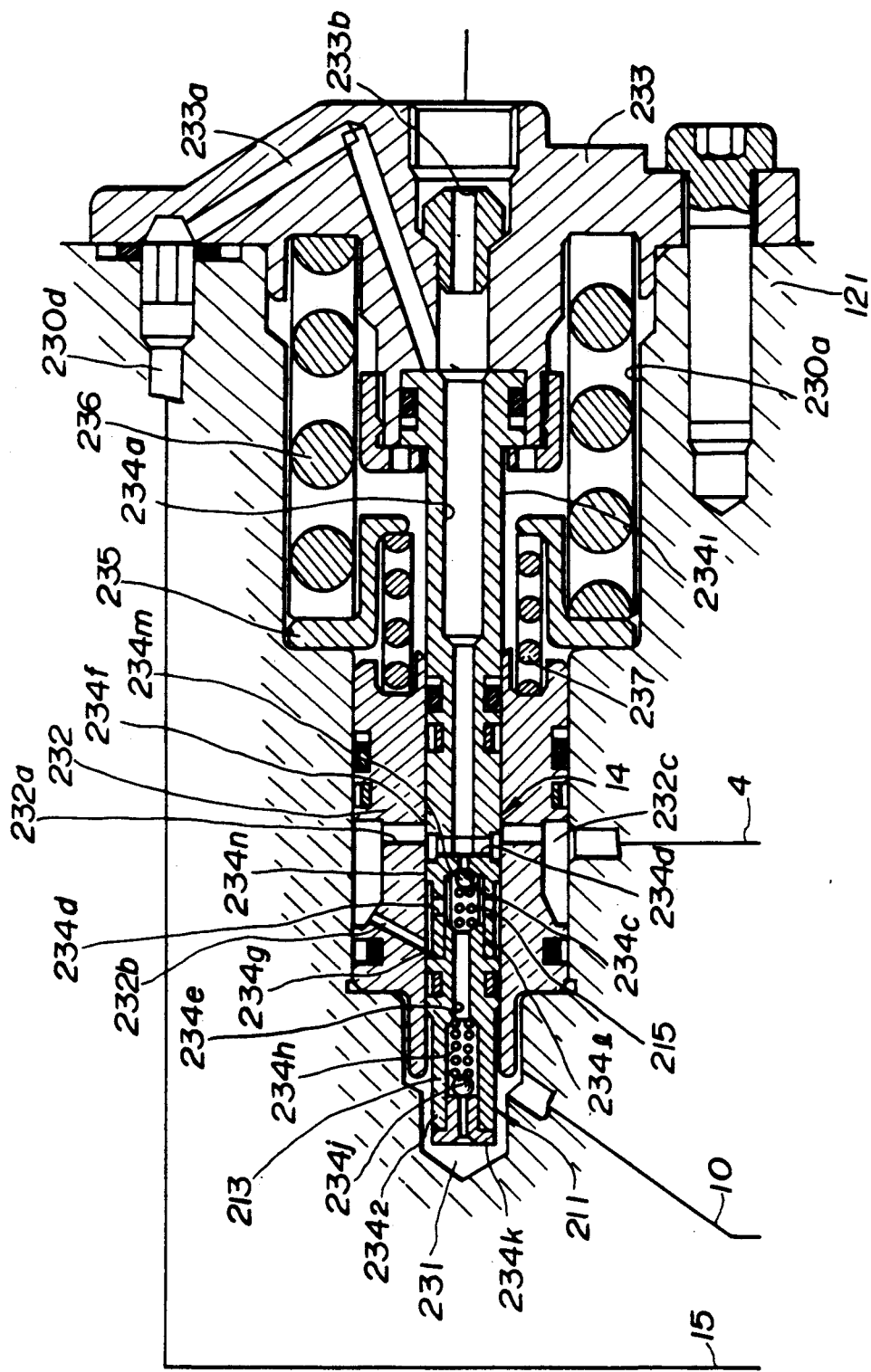
FIG. 4 is a partial section of the preferred embodiment of the actuator unit, showing construction of a pressure accumulator employed in the actuator unit.

FIG. 4 shows another portion of the preferred embodiment of the integrated actuator unit according to the invention. As can be seen, the casing 121 is formed with an accumulator receptacle bore 230a. An inner piston 234 is disposed within the bore 230a for defining a pressure accumulation chamber 231 at the bottom of the bore. The piston 232 comprises an axially aligned first component 234₁ and second component 234₂. The first component 234₁ is restricted in axial movement by means of a cover plate 233. The second component 234₂ engages with the first component 234₁. For this, the first component 234₁ is formed with an axial bore 234c to which the outer end of the second component 34₂ engages. The axial bore 234c is in communication with a radially extending bore 234d and also in communication with an axially extending bore 234c formed through the second component 234₂.

A spring seat 235 is also disposed within the bore 230a. The spring seat 235 is resiliently biased by means of a coil spring 236 which is seated on the cover plate 233. A cylindrical piston body 232 is thrustingly disposed within the bore 230a and movable relative to the inner piston 234. The cylindrical piston 232 is associated with the spring seat 235 so that the cylindrical piston is resiliently biased by means of a coil spring 237 which is disposed between the spring seat and the cylindrical piston. With the force of the coil spring 237, the cylindrical piston 232 is biased toward the pressure accumulation chamber 231.

The cylindrical piston 232 is formed with a plurality of radially extending openings 232a and 232b. The radially extending opening 232a forms a variable throttling orifice together with the radial opening 234b of the first component 234₁ of the inner piston 234. The cylindrical piston 232 is positioned to fully align the radially extending opening 232a with the radial opening 234a so as to provide fully opened radial path while no pressure is accumulated in the pressure accumulation chamber 231. According to increasing of the fluid pressure in the pressure accumulation chamber 231, the outer cylindrical piston 232 moves outwardly for causing offset between the radially extending opening 232a and the radial opening 234b for restricting fluid flow rate. On the other hand, the radially extending opening 232b is normally opened to an annular chamber 234g formed between the outer cylindrical piston body 232 and the inner piston 234. Both of the radially extending openings 232a and 232b are in communication with an annular chamber 232c defined between the inner periphery of the bore 230a and the outer periphery of the outer cylindrical piston body 232. The annular chamber 232c is in communication with the inlet of the EV valve 6 via the branch line 4.

One-way check valve 213 is provided in the second component 234₂ of the inner piston 234. The check valve 213 comprises a ball check valve member 234j disposed within the axial bore 234e and is normally biased toward a valve seat member 234k equipped on the inner end of the second component 234₂ and thus is placed in a closing position by means of a check spring 234h. Also, another one-way check valve 20 is provided in the axial-bore 234e. The check valve 20 comprises a ball check valve member 234m biased by means of a check spring 234l. As can be seen from FIG. 4, a metal seal 234n is provided between the radial opening 234b and the annular chamber 234g. The metal seal 234n is of 3 to 5 mm in length and forms a clearance between the inner periphery of the inner piston receptacle bore of the cylindrical piston body 232 in a thickness of 4 through 8 μm.

As can be seen from FIG. 4, the pressure accumulation chamber 231 is communicated with the re-circulation line 10 for introducing the pressurized fluid from the fluid pump.

In addition, the by-pass line 15 is connected to a port 230d which is in communication with the axial bore 234a of the inner piston 234, which axial bore is, in turn, in communication with the primary line 3 for introducing fluid pressure built up in the master cylinder 1.

Operation of the actuator unit as set forth above will be briefly discussed herebelow in order to facilitate better understanding of the present invention.

In the normal state, the EV valve 6 is maintained at a fully open position and the AV valve 9 is in a fully blocked position so that the braking pressure in the wheel cylinder 2 substantially corresponds to the fluid pressure built up in the master cylinder 1. Therefore, at this state, braking force precisely corresponding to the magnitude of depression of the brake pedal can be obtained.

On the other hand, one of the typical anti-skid brake controls is initiated in response to a wheel deceleration exceeding a predetermined wheel deceleration threshold. As soon as the anti-skid control becomes active, an anti-skid control signal is fed to the EV and AV valves 6 and 9 for placing both of the valves in the closed position for placing the actuator unit in a HOLD mode. At this time, the braking pressure in the wheel cylinder 2 is maintained constant irrespective of variation of the fluid pressure supplied from the master cylinder 1. Since the braking pressure is maintained constant at the increased level, the wheel continues deceleration to lead the wheel slippage to exceed a predetermined wheel slippage threshold which is a value set at a target wheel slippage (10 to 20% of the vehicle speed). When the magnitude of wheel slippage becomes greater than the wheel slippage threshold, the anti-skid control signal orders the AV valve 9 to open for lowering the braking pressure in the wheel cylinder. As a result, the increased fluid pressure in the wheel cylinder is drained to the reservoir 8 via the drain line 7. Part of the drained fluid is sucked by the recirculation line 10 and recirculated to the branch line 4 and to the pressure accumulator 13.

According to a decreasing of the braking pressure in the wheel cylinder 2, the wheel is driven by the inertia moment on the vehicle body and thus accelerated. When the wheel acceleration becomes in excess of a predetermined acceleration threshold, the actuator mode is again switched into a HOLD mode for maintaining the decreased level of braking pressure in the wheel cylinder constant. Due to a relatively low level of the braking pressure, the wheel speed is still increased even after switching the operational mode of the actuator unit from a RELEASE mode to a HOLD mode, and becomes higher than a vehicle body speed representative value by over-shooting. Thereafter, wheel acceleration is gradually decreased and the wheel speed returns to the vehicle body speed representative value. In response to the wheel acceleration decreasing across the wheel acceleration threshold, the anti-skid control signal is switched into the APPLICATION mode for operating the EV valve 6 to open and maintain the AV valve at the closed position. The aforementioned skid control cycle is repeated until the vehicle stops or the braking pressure is released.

During the process set forth above, the fluid pressure supplied through the re-application line 11 is regulated by the orifice 14 and the one-way check valve 20 as well as the pressure accumulator 13. As a result, pulsation of the fluid pump 12 will not affect pressure in the branch line 4. Furthermore, during the aforementioned braking operation, the air introduced into the brake fluid in the circuit can be effectively ventilated through the ventilation valve 18 and an additional ventilation valve 19 provided in the vicinity of the wheel cylinder.

Further detailed operation of the anti-skid brake control system may be appreciated from the aforementioned U.S. patents.

As will be appreciated herefrom, according to the present invention, all components forming the anti-skid brake control actuators are assembled into the integrated unit by housing those within a cast casing. In such construction, since the casing wall serves as a reinforcement for the valve casing and so forth, respective valves, i.e. EV and AV values can be formed compactly. Furthermore, since the fluid passages are built in the casing, the size of the overall unit can be made compact and light weight for conveniently installation on the vehicle body.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is discussed in terms of an electrically or electronically controlled anti-skid brake system, the actuator unit construction as herewith proposed is also applicable for the mechanically or hydraulically operable actuator unit for the anti-skid brake system.

What is claimed is:

1. An integrated actuator unit for an anti-skid automotive brake system comprising:

a cast casing defining a first space for receiving an inlet valve assembly for introducing a braking pressure built in a master cylinder of a hydraulic brake circuit to a wheel cylinder, and a second space for receiving an outlet valve assembly for draining braking pressure in the wheel cylinder, said inlet and outlet valves being selectively operated to open and closed positions for adjusting braking pressure in said wheel cylinder;

and wherein said casing comprises a main body defining at one end open bores in a parallel relationship to each other, which bores serve as said first and said second spaces for receiving said inlet and outlet valves, and a cover member for sealingly closing the open ends of said bores;

and wherein said casing further defines a third bore extending essentially perpendicular to said first and second bores and internally communicated at least with said first bore, said third bore serving for receiving a pressure accumulator connected to an integrally formed path which is connected a drain line of said hydraulic circuit for receiving a pressurized fluid via a fluid pump, which accumulator is connected to said first space for supplying pressurized fluid via a path integrally formed with said casing; and fluid flow path means integrally formed with said casing for communication with said hydraulic brake circuit and said first and second spaces.

2. An integrated actuator unit as set forth in claim 1, which further comprises a ventilation path means integrally provided with said casing for ventilating air introduced into working fluid therethrough.

3. An integrated actuator as set forth in claim 2, wherein said ventilation path means includes a component communicating said first and second space and also communicating with a discharge outlet of said ventilation path means.

4. An integrated actuator as set forth in claim 3, wherein said communication component is formed of a metallic pipe integrally cast with said casing by internal chill.

5. An integrated actuator as set forth in claim 4, wherein said metallic pipe is formed of a metal having a higher melting point than that of a metallic material of said casing.

6. An integrated actuator unit as set forth in claim 5, wherein said casing is formed of an aluminum alloy and said metallic pipe is formed of a steel.

7. An integrated actuator unit as set forth in claim 1, wherein said pressure accumulator further incorporates a pressure regulating means which is integrally formed with said actuator and supplies regulated pressure for said first space.

8. An anti-skid brake system for an automotive vehicle, comprising:
   a master cylinder for building up hydraulic braking pressure according to depression of a brake pedal;
   a wheel cylinder associated with a vehicular wheel for applying a braking force for decelerating rotation of said vehicular wheel;
   a first line for supplying a braking pressure generated in said master cylinder;
   a second line connected to a fluid reservoir for draining fluid in said wheel cylinder to said fluid reservoir;
   a third line connected to said wheel cylinder;
   an anti-skid actuator unit including a cast casing defining a plurality of fluid path including a first path, a second path, a third path, a first space for receiving an inlet valve assembly for introducing a braking pressure built in a master cylinder of a hydraulic brake circuit to a wheel cylinder, and a second space for receiving an outlet valve assembly for draining braking pressure in the wheel cylinder, said inlet and outlet valves being selectively operated to open and closed positions for adjusting braking pressure in said wheel cylinder, said first path communicating said first line to said first space, said second path communicating said second line with said second space and said third path for communicating said first and second space with said third line;
   wherein said casing comprises a main body defining at one end open bores in a parallel relationship to each other, which bores serve as said first and said second spaces for receiving said inlet and outlet valves, and a cover member for sealingly closing the open ends of said bores;
   and wherein said casing further defines a third bore extending essentially perpendicular to said first and second bores and internally communicated at least with said first bore via a fourth path integrally formed with said casing, said third bore serving for receiving a pressure accumulator connected to an integrally formed fifth path which is connected to a drain line of said hydraulic circuit for receiving a pressurized fluid via a fluid pump, which accumulator is connected to said first space for supplying pressurized fluid via a sixth path integrally formed with said casing and communicated with said first path.

9. An anti-skid brake system as set forth in claim 8, which further comprises a ventilation path means integrally provided with said casing for ventilating air introduced into working fluid therethrough.

10. An anti-skid brake system as set forth in claim 9, wherein said ventilation path means includes a component communicating said first and second space and also communicating with a discharge outlet of said ventilation path means.

11. An anti-skid brake system as set forth in claim 10, wherein said communication component is formed of a metallic pipe integrally cast with said casing by internal chill.

12. An anti-skid brake system as set forth in claim 11, wherein said metallic pipe is formed of a metal having a higher melting point than that of a metallic material of said casing.

13. An integrated actuator unit as set forth in claim 12, wherein said casing is formed of an aluminum alloy and said metallic pipe is formed of a steel.

14. An integrated actuator unit as set forth in claim 8, wherein said pressure accumulator further incorporates a pressure regulating means which is integrally formed with said actuator and supplies regulated pressure for said first space.

15. An integrated actuator unit for an anti-skid automotive brake system comprising:
   a cast casing defining a first space for receiving an inlet valve assembly for introducing a braking pressure built in a master cylinder of a hydraulic brake circuit to a wheel cylinder, and a second space for receiving an outlet valve assembly for draining braking pressure in the wheel cylinder, said inlet and outlet valves being selectively operated to open and closed positions for adjusting braking pressure in said wheel cylinder;
   and wherein said casing comprises a main body defining at one end open bores in a parallel relationship to each other, which bores serve as said first and said second spaces for receiving said inlet and outlet valves, and a cover member for sealingly closing the open ends of said bores;
   said casing further defining a ventilation path means integrally provided with said casing for ventilating air introduced in working fluid therethrough, wherein said ventilation path means includes a component communicating said first and second space and also communicating with a discharge outlet of said ventilation path means;
   wherein said communication component is formed of a metallic pipe integrally cast with said casing by internal chill; and
   fluid flow path means integrally formed with said casing for communication with said hydraulic brake circuit and said first and second spaces.

16. An integrated actuator unit as set forth in claim 15, wherein said casing is formed of an aluminum alloy and said metallic pipe is formed of a steel.

17. An anti-skid brake system for an automotive vehicle, comprising:
   a master cylinder for building up hydraulic braking pressure according to depression of a brake pedal;
   a wheel cylinder associated with a vehicular wheel for applying a braking force for decelerating rotation of said vehicular wheel;

a first line for supplying a braking pressure generated in said master cylinder;

a second line connected to a fluid reservoir for draining fluid in said wheel cylinder to said fluid reservoir;

a third line connected to said wheel cylinder;

an anti-skid actuator unit including a cast casing defining a plurality of fluid path including a first path, a second path, third path, a first space for receiving an inlet valve assembly for introducing a braking pressure built in a master cylinder of a hydraulic brake circuit to a wheel cylinder, and a second space for receiving an outlet valve assembly for draining braking pressure in the wheel cylinder, said inlet and outlet valves being selectively operated to open and closed positions for adjusting braking pressure in said wheel cylinder, said first path communicating said first line to said first space, said second path communicating said second line with said second space and said third path for communicating said first and second space with said third line;

wherein said casing comprises a main body defining one end open bores in parallel relationship to each other, which bores serve as said first and said second spaces for receiving said inlet and outlet valves, and a cover member for sealingly closing the open ends of said bores;

said casing further defining a ventilation path means integrally provided with said casing for ventilating air introduced in working fluid therethrough, wherein said ventilation path means including a component communicating said first and second space and also communicating with a discharge outlet of said ventilation path means;

wherein said communication component is formed of a metallic pipe integrally cast with said casing by internal chill; and wherein said metallic pipe is formed of a metal having a higher melting point than that of a metallic material of said casing.

18. An integrated actuator unit as set forth in claim 17, wherein said casing is formed of an aluminum alloy and said metallic pipe is formed of a steel.

* * * * *